Nov. 3, 1925.  
R. E. STEWART  
1,559,920  
VARIABLE SPEED INDUCTION MOTOR  
Filed Oct. 14, 1920  2 Sheets-Sheet 2

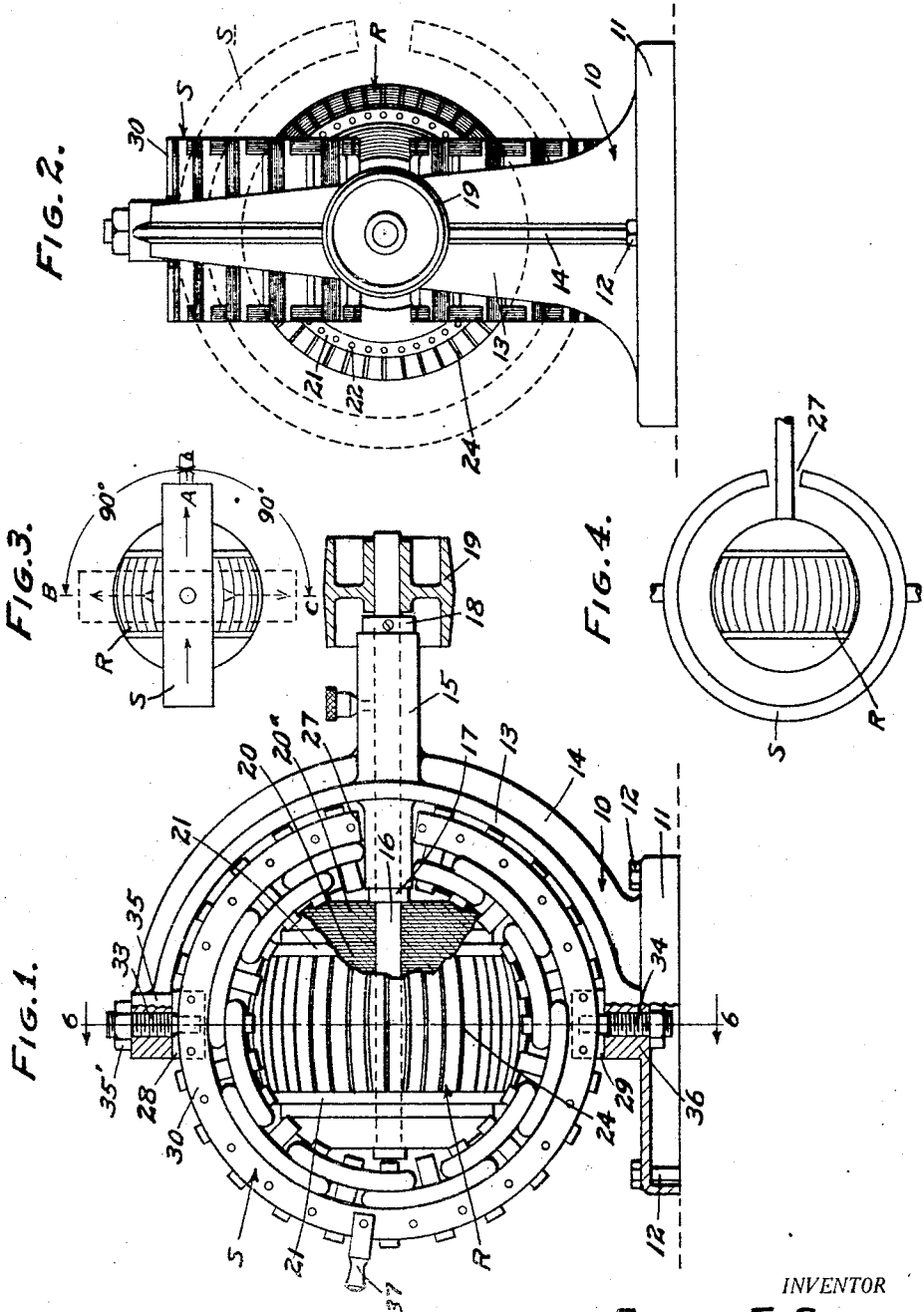

INVENTOR  
RALPH E. STEWART  
BY  
ATTORNEYS.

Patented Nov. 3, 1925.

1,559,920

UNITED STATES PATENT OFFICE.

RALPH E. STEWART, OF LOS ANGELES, CALIFORNIA, ASSIGNOR TO NANCY J. STEWART, OF LOS ANGELES, CALIFORNIA.

VARIABLE-SPEED INDUCTION MOTOR.

Application filed October 14, 1920. Serial No. 416,812.

*To all whom it may concern:*

Be it known that I, RALPH E. STEWART, a citizen of the United States, residing at Los Angeles, in the county of Los Angeles and State of California, have invented new and useful Improvements in Variable-Speed Induction Motors, of which the following is a specification.

This invention relates generally to electric motors, and specifically to electric induction motors; and has for its prime object the provision of a motor, of this general class, embodying a principle of construction wherein the starting, stopping, reversing and speed of the rotor, is governed by altering the degree of angularity between the horizontal axes of the stator and rotor.

Specifically my invention comprises a rotor, or armature, mounted to rotate in the usual manner about a horizontal axis in a suitable frame, and a stator pivotally mounted on the same frame, around the rotor, and adapted to be horizontally rotated about a vertical axis relative thereto. With this structure the degree of angularity between the horizontal axes of the rotor and stator is enabled to be varied, resulting in a corresponding variation in the magnetic influence of the latter over the former, with a consequent variation in speed of rotation of the rotor.

My invention will be more fully explained in the following specification, reference being had to the accompanying drawings, in which:

Fig. 1 is a side elevation of my improved motor, taken at right angles to the view shown in Fig. 2, parts being shown in section.

Fig. 2 is a view taken at right angles to the view shown in Fig. 1.

Fig. 3 is a diagrammatic plan view illustrating the direction of travel of the magnetic field.

Fig. 4 is a diagrammatic elevational view showing the relation between the rotor and stator.

Figure 5:
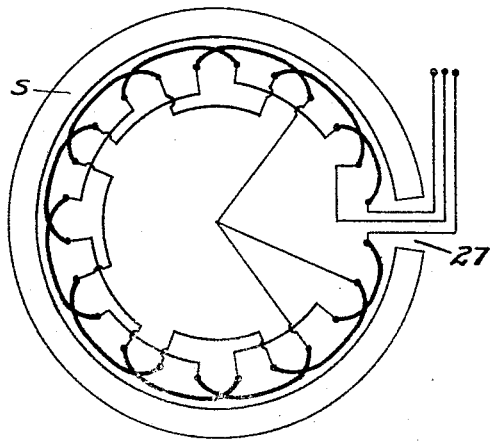
Fig. 5 is a diagrammatic view illustrating an eight pole twenty-four slot single layer three phase stator winding.

My invention as illustrated embodies a modified standard type rotor and stator incorporated with my novel construction as hereinafter set forth.

Referring now to the drawings, and particularly to Figs. 1 and 2, the numeral 10 designates a suitable frame for supporting the rotor R and the stator S. The frame 10 comprises a base 11, having suitable anchor bolts 12, and a semi-circular standard 13, extending upwardly from the base 11, and preferably formed integral therewith; the latter having a reinforcing rib 14. A horizontal bearing 15 is formed integral with the standard 13, the axis of which extends at right angles to the horizontal axis of the standard 13, and in a plane therewith.

A shaft 16 is revolubly supported in the bearing 15, on the inner end of which is rigidly mounted the rotor R. The shaft 16 is secured against longitudinal movement by means of collars 17 and 18, keyed or secured to the shaft in any suitable manner. A belt pulley 19 is rigidly secured to the outer end of the shaft 16 for the usual purposes.

Figure 8:
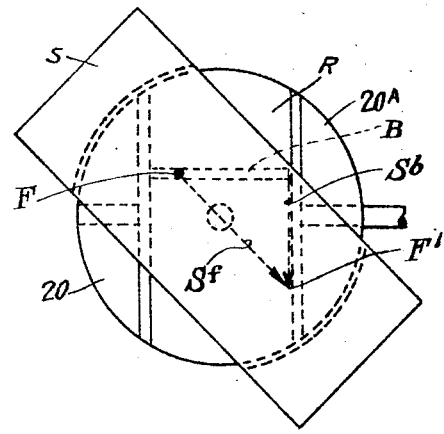
Fig. 8 is a diagrammatic plan view illustrating the manner of rotation of the stator, relative to the rotor, to control the speed of the latter.

The rotor R is spherical in configuration and is mounted on the shaft 16, within the semi-circular standard 13, so that its vertical axis is co-axial with the vertical axis of the stator S, which will be more fully hereinafter explained. The rotor R is of standard construction, and comprises the usual laminæ or plates 20, as clearly shown in Fig. 6, confined between rings 21, the latter being cross connected by the usual rotor bars 22, extending through perforations 23, located at the ends of slots 24, the latter extending inwardly from the periphery of the plates. The plates 20 are slotted, as at 25, inwardly from their peripheries to a point adjacent their central bearing apertures 26, for the purpose of breaking up eddy currents when the stator is in neutral position. The secondary laminæ or plates 20ª are slotted inwardly from their peripheries as plates 20 at 25 for the same reason. Plates 20 and 20ª are supported on shaft 16 and are in juxtaposition, only enough of the latter being cut away to allow for rings 21, for the purpose of providing a path of low reluctance for the magnetic flux, thereby reducing the exciting current and also to enable flux to link more effectively with rotor bars 22 when in positions as shown in Fig. 8. If it were assumed that the plates 20 and 20ª were not present it is seen, as in Fig. 8, that the flux from one of the poles would pass through a considerable air gap, and as a result, would decrease the flux density that is cut by the rotor bars, and as it is one of the principal objects of this invention to maintain a constant flux for varying speeds and angular positions of the stator, it is necessary to have the plates 20 for providing a path of low reluctance.

Figure 6:
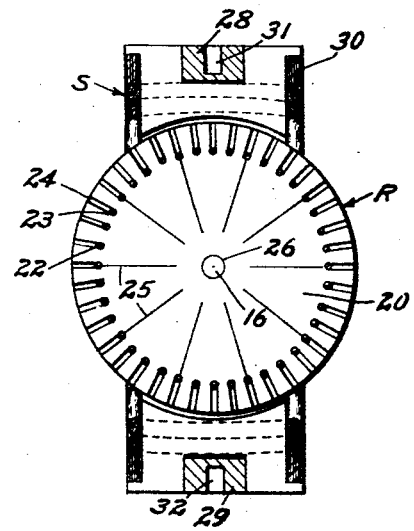
Fig. 6 is a vertical transverse section taken on line 6—6 of Fig. 1.

The stator S is circular in elevation, constructed of laminæ, and has a cross-sectional configuration as illustrated in Fig. 6, to conform to the spherical configuration of the rotor R. It has a gap 27 formed for the purpose of allowing its horizontal rotation past the bearing 15. The stator bearing blocks 28 and 29 are set into the stator frame 30, in which seats 31 and 32, respectively, are formed for the reception of pivot pins 33 and 34, adjustably mounted in bearings 35 and 36 of the standard 13. The pins 33 and 34 may also be provided with lock nuts 35'. The pins 33 and 34 are co-axial and constitute the vertical axis, about which the stator rotates, which axis is co-axial with the vertical axis of the rotor. The stator S is provided with a handle 37 by which it is rotated about its axis.

Figure 7:
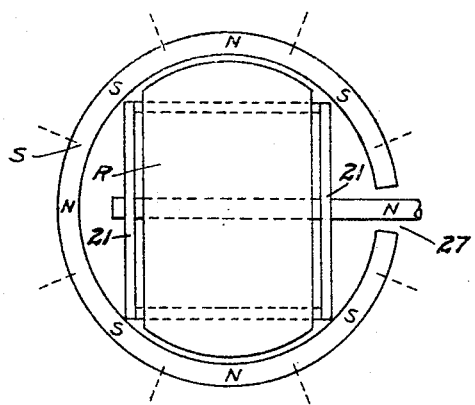
Fig. 7 is a diagrammatic view illustrating the relative positions of the rotor end rings relative to an instantaneous position of the poles of the stator when the latter is in inoperative position.

In the winding of the stator S, and the construction of the rotor R these parts are so arranged that when the stator is turned to its neutral position as shown in Fig. 7, the rings 21 will extend between and have their diametrically opposite sides under like poles, in this case negative, to prevent short circuiting, that is if the stator had six poles, the diametrically opposite points of the ring 21 would lie under poles of different polarity, and as a consequence the natural movement of the field would cause electromotive forces to be generated within the ring 21, and to travel in the same direction, and the ring being of low resistance, a high current would be set up which would cause unnecessary heating of the ring, it is therefore obvious that by having a suitable number of poles, that the diametrically opposite points will lie under poles of like polarity. In this manner the revolving magnetic field induces electromotive forces in the rings which forces oppose each other and produce a resultant of zero so it is obvious that no current would flow in the rings 21.

In the operation of my motor, assuming the stator to be in neutral position as shown in Figs. 1 to 7, inclusive, and the rotor at rest, and the direction of travel of the magnetic field to be as indicated by the arrow in Fig. 3. By turning the end A (Fig. 3) to the point B the direction of flux will be as indicated by the dot-dash arrow; and by turning it in the opposite direction to the position C the flux will be in the opposite direction, and hence the reversal of direction of rotation of the rotor will follow. In the same manner, partial rotation of the stator, as shown in Fig. 8, will correspondingly reduce the speed of the rotor, as the magnetic field is revolving in a plane more nearly parallel with the rotor bars 22.

As it is a well known fact that electrical reactions between the revolving magnetic field and the conductors on the rotor, cause the latter to follow the former, hence the direction of rotation of the rotor may be changed and the speed varied from zero to maximum, in either direction, depending only on the relative positions of the rotor and stator. When the stator is in neutral position, relative to the rotor, that is, when its horizontal axis is at right angles to the horizontal axis of the rotor, the magnetic field will be revolving in a plane parallel with the rotor bars, hence inducing no current in them and no rotary action taking place in the rotor. It is further a well known fact that, for a magnetic flux to induce a current in a conductor there must be a change in the value of the flux linked with the conductor.

To further illustrate how the speed of the rotor may be changed by shifting of the stator, only one rotor bar B, Fig. 8 will be considered in connection with a single point F in the flux of the travelling field. As has been stated, it is a well known fact that the bars cannot travel faster than the field, so that if the point F in the field is assumed to travel at a certain rate of speed $Sf$, the rotor bar, being considered to move in a path angularly disposed to the direction of the field, can only move a distance equal to the component $Sb$, which is obvious, is some function of the speed of the field $Sf$, depending upon the angular adjustment of the stator.

To amplify further, if the point F of the field travels to the point F' and the rotor bar cannot travel faster than the point F, it is seen that the bar will reach point F' at the practically same instant, excluding torque on the rotor, and from the diagram on Fig. 8 it is seen that the vector $Sf$ is greater than its component $Sb$, and it is obvious that the speed of the rotor will be $Sb$ while the speed of the field remains the same for any angular position of the stator.

Having described my invention I claim:

1. An induction motor comprising a rotor, a stator having a rotating field of constant flux density, and means for varying the position of the stator to vary the angle at which the flux traverses the rotor whereby the rotational speed of the rotor is varied.

2. An induction motor comprising a rotor, a stator having a rotating field of constant flux density, and means for varying the position of the stator to vary the angle at which the flux traverses the rotor whereby the rotational speed of the rotor is varied and the direction of rotation controlled.

3. An electric induction motor comprising a rotor mounted on a horizontally disposed shaft and a stator surrounding said rotor and adujustable about a vertical axis, and means whereby by adjusting said stator the speed of said rotor is varied.

4. An electric induction motor comprising a rotor rotatable about a horizontal axis and a stator adjustable about a vertical axis, and means whereby the adjustment of said stator causes the flux to cut the rotor bars at an angle.

5. An electric induction motor comprising a rotor rotatable about a horizontal axis, and a co-axial stator adjustable about a vertical axis.

6. An electric induction motor comprising a spherical rotor mounted on a horizontally disposed shaft, and a co-axial stator adjustable about a vertical co-axial axis, around said rotor, said stator being adjustable through an arc of 180 degrees.

7. An electric induction motor comprising a frame consisting of a base and a semi-circular standard, a shaft revolubly mounted in said standard with its axis at right angles to the horizontal axis of the standard, and in a horizontal plane therewith, a spherical rotor rigidly mounted on said shaft, a stator mounted in said standard co-axial with said rotor and rotatable about a vertical axis.

8. An induction motor comprising a rotor mounted for rotation about a fixed axis and including elements disposed substantially parallel with the axis of rotation, and a stator having a rotating field of constant flux density and mounted for movement about an axis perpendicular to the rotor axis whereby the angle at which the flux traverses the rotor elements can be varied for the purpose described.

9. An induction motor comprising a rotor, a stator having a constant flux density, and means for varying the position of the stator with respect to the rotor whereby the inductive action of the flux upon the rotor is varied and in such manner that the rotational speed of the rotor is correspondingly varied.

10. An induction motor comprising a rotor mounted for rotation about a fixed axis, a stator around the rotor and adjustable about an axis disposed in angular relation to the rotor axis, and so arranged that an adjustment of the stator varies the rotational speed of the rotor.

In testimony whereof I have signed my name to this specification.

RALPH E. STEWART.